United States Patent [19]

Case

[11] Patent Number: 5,990,959
[45] Date of Patent: Nov. 23, 1999

[54] METHOD, SYSTEM AND PRODUCT FOR DIRECT RENDERING OF VIDEO IMAGES TO A VIDEO DATA STREAM

[75] Inventor: Eliot M. Case, Denver, Colo.

[73] Assignees: U S West, Inc., Denver; MediaOne Group, Inc., Englewood, both of Colo.

[21] Appl. No.: 08/771,596

[22] Filed: Dec. 20, 1996

[51] Int. Cl.⁶ ............................. H04N 7/18; H04N 7/133
[52] U.S. Cl. .................. 348/409; 348/412; 348/416; 348/455; 348/699; 348/700
[58] Field of Search .................................. 348/384, 390, 348/402, 405, 409, 411, 412, 25, 27, 29, 169, 170, 171, 416, 415, 699, 700, 586, 587; 382/236, 237, 243, 244; 345/415, 419

[56] References Cited

U.S. PATENT DOCUMENTS

| | | |
|---|---|---|
| 4,969,040 | 11/1990 | Gharavi . |
| 5,214,502 | 5/1993 | Stone et al. . |
| 5,309,232 | 5/1994 | Hartung et al. . |
| 5,347,306 | 9/1994 | Nitta . |
| 5,371,544 | 12/1994 | Jacquin et al. . |
| 5,408,274 | 4/1995 | Chang et al. ............................. 348/700 |
| 5,422,674 | 6/1995 | Hooper et al. . |
| 5,448,568 | 9/1995 | Delpuch et al. . |
| 5,515,107 | 5/1996 | Chiang et al. . |
| 5,517,581 | 5/1996 | Johnston et al. . |
| 5,557,684 | 9/1996 | Wang et al. ............................. 382/107 |
| 5,606,655 | 2/1997 | Arman et al. ............................. 395/140 |
| 5,694,331 | 12/1997 | Yamamoto et al. ..................... 364/514 |
| 5,742,289 | 4/1998 | Naylor et al. ............................. 348/402 |
| 5,764,814 | 6/1998 | Chen et al. ............................. 382/243 |

OTHER PUBLICATIONS

Mohammad H. Ghavamnia & Xue D. Yang, Direct Rendering of Laplacian Pyramid Compressed Volume Date, IEEE Computer Society Press, 1995.

*Primary Examiner*—Anand S. Rao
*Attorney, Agent, or Firm*—Brooks & Kushman

[57] ABSTRACT

A method, system and product are provided for direct rendering of video images to a compressed video data stream. The method includes generating encoded video data directly from an electronic graphic system, the encoded video data representing a full frame image, and generating update encoded video data directly from the electronic graphic system, the update encoded video data representing changes in the full frame image. The method also includes generating movement vector encoded video data directly from the electronic graphic system, the movement vector encoded video data representing movement in the full frame image, and decoding the encoded video data, the update encoded video data, and the movement vector encoded video data for playback at a destination. The system includes control logic for performing the method. The product includes a storage medium having computer readable programmed instructions recorded thereon for performing the method.

9 Claims, 1 Drawing Sheet

METHOD, SYSTEM AND PRODUCT FOR DIRECT RENDERING OF VIDEO IMAGES TO A VIDEO DATA STREAM

TECHNICAL FIELD

This invention relates to a method, system and product for direct rendering of video images to a compressed video data stream.

BACKGROUND ART

A number of formats and/or standards have been developed for compression of video data. One such format for still pictures is known as the Joint Picture Expert Group (JPEG) video standard. According to that standard, if a set of pixels in a picture are all the same color, a truncated version of the data for that portion of the picture is transmitted.

There also exist both JPEG and Motion Picture Expert Group (MPEG) formats for motion pictures. For example, MPEG layer 2 encodes or compresses video data so that complete image information frames are only transmitted periodically. In between, other frames are transmitted that contain only updated information. A prediction scheme adapts between frames. In this fashion, most of the data transmission effort comes from the frames containing complete image information, while the remaining frames contain only limited data.

In standard, classical computer animation, each complete frame of video including every single object in the frame is rendered to a conventional video data format. Thus, even though most objects remain stationary from image to image, they must still be recalculated to render an entire frame. While this is the best way to produce a high quality motion picture, it is a very lengthy process.

In that regard, performing computerized animation on conventional video output formats such as D1 (extremely high end component data format), or even in NTSC and PAL, or any other conventional raster-based video system requires extremely large quantities of calculations to "render" a full screen of a simulated image. Thereafter, the conventional video data format are typically compressed to the I, B and P frames of the MPEG layer 2 format.

However, for applications using MPEG video, especially low rate MPEG video, such as an interactive game on CD-ROM, it would be preferable if calculations could be simplified so that images could actually be rendered directly to the datastream for reconstruction at the destination. Thus, there exists a need for a method, system and product for direct rendering of video images to a compressed video data stream. Such a method, system and product would provide for rendering on demand, thereby eliminating the need to store huge amounts of asset pictures.

SUMMARY OF THE INVENTION

Accordingly, it is the principle object of the present invention to provide a method, system and product for direct rendering of video images to a compressed video data stream.

According to the present invention, then, a method is provided for direct rendering of video images to a compressed video data stream. The method comprises generating encoded video data directly from an electronic graphic system, the encoded video data representing a full frame image, and generating update encoded video data directly from the electronic graphic system, the update encoded video data representing changes in the full frame image. The method further comprises generating movement vector encoded video data directly from the electronic graphic system, the movement vector encoded video data representing movement in the full frame image, and decoding the encoded video data, the update encoded video data, and the movement vector encoded video data for playback at a destination.

A system for direct rendering of video images to a compressed video data format is also provided. The system comprises an electronic graphic system, and control logic operative to generate encoded video data directly fry the electronic graphic system, the encoded video data representing a full frame image, to generate update encoded video data directly from the electronic graphic system, the update encoded video data representing changes in the full frame image, and to generate movement vector encoded video data directly from the electronic graphic system, the movement vector encoded video data representing movement in the full frame image. The system further comprises a decoder for decoding the encoded video data, the update encoded video data, and the movement vector encoded video data for playback at a destination.

A product for direct rendering of video images to a compressed video data stream is also provided. The product is for use with an electronic graphic system and a decoder. The product comprises a storage medium having computer readable programmed instructions recorded thereon, the instructions operative to generate encoded video data directly fry the electronic graphic system, the encoded video data representing a full frame image, to generate update encoded video data directly from the electronic graphic system, the update encoded video data representing changes in the full frame image, and to generate movement vector encoded video data directly from the electronic graphic system, the movement vector encoded video data representing movement in the full frame image. The decoder is provided for decoding the encoded video data, the update encoded video data, and the movement vector encoded video data for playback at a destination.

These and other objects, features and advantages will be readily apparent upon consideration of the following detailed description in conjunction with the accompanying drawings.

BEST MODE FOR CARRYING OUT THE INVENTION

Figure 1:
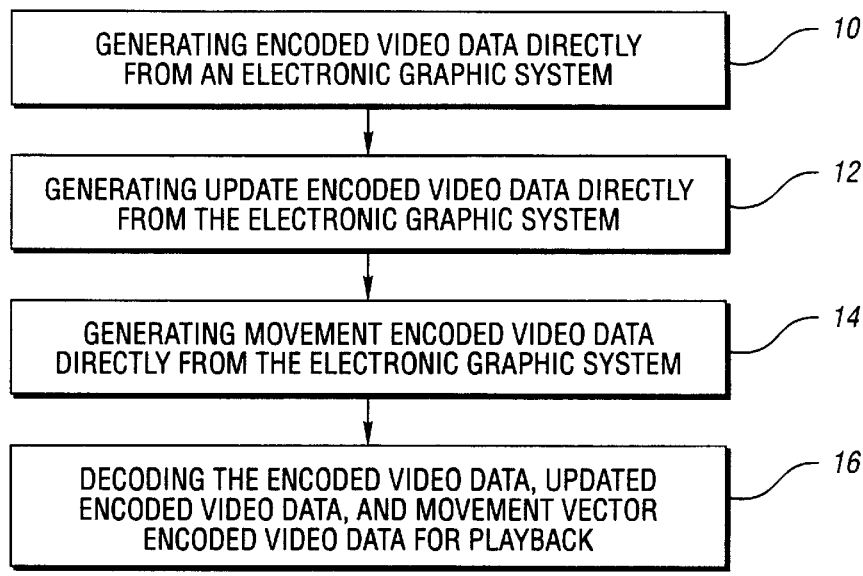
FIG. 1 is an exemplary simplified flowchart illustrating the method of the present invention.

In general, the present invention is designed for rendering animated visual images directly to MPEG data compressed video streams or subband encoded data compressed video streams. In such a fashion, the present invention minimizes calculations required by environment or character simulation systems.

As previously mentioned, in MPEG layer 2 video compression, several types of picture information are transmitted. These are referred to as "I" frames, "P" frames, and "B" frames. I frames are an entire digital frame of video, or an entire set of data for an entire picture frame, and are encoded using JPEG type data compression techniques. I frames are transmitted periodically in the data stream (typically every 15 frames, or 2 frames per second) to "re-set" a clean image, or identify what should be the actual image.

B frames and P frames are sent between I frames, and lack all of the information contained in I frames. In that regard, B and P frames contain only update information and movement vectors for portions of the image. That is, B and P frames indicate that certain data has changed or is moving in a certain direction at a certain rate. More specifically, a P frame contains only information "predicted" in reference to an I frame, while a B frames contains only information "bi-directional predicted" between I frames. Since B and P frames represent only movement or changes in the picture between I frames, they contain only a minimal amount of data.

As also previously stated, full frame rendering of each frame of video to a conventional video data format requires large amounts of calculations and is a lengthy process. Moreover, the conventional video data format is then typically compressed to MPEG layer 2 format.

However, if the final animated video piece is to be delivered on a compressed video data stream, instead of rendering to a high-end video format and converting down to the compressed video format (usually compromising the picture), the rendering can be performed directly to the compressed data stream with much fewer calculations. Instead of recalculating all of the information for animation and then downcoding it to the MPEG format to get all movement vectors, etc., the present invention renders only the new data needed, such as foreground information, since all other information is already contained in the rendering path. Thus, for movement, only a movement vector need be stated. Moreover, such rendering is done directly to the compressed video data stream using only an original, fully rendered and compressed frame.

In that regard, with respect to MPEG layer 2, a prediction scheme associated with an electronic graphic system knows when an I frame must be sent to refresh an entire image, such as for a scene change. However, once an I frame is loaded, all further rendering may be done directly from that I frame since the prediction scheme knows what data must change. In such a fashion, the present invention takes advantage of the inherent information contained in a rendering program and directly applies that to compressed video.

In the MPEG example cited above, the present invention directly renders to B and P frames by directly synthesizing or making such frames. Instead of rendering 30 frames per second of full frame video and then compressing that to an MPEG format, the present invention directly encodes MPEG video to eliminate all intermediate steps. Moreover, by rendering in a data compressed mode, only new information need be encoded so that no processing need be wasted on the intermediate steps of the prior art.

Still further, the present invention provides the same destination quality for pictures as the prior art. In that regard, the resulting compressed video data is the same, only the intermediate rendering steps have been eliminated. That is, the source need not render to an intermediate video data format for conversion to a compressed video data format. Instead, rendering may be done directly to that medium.

For instance, for a ball moving across a black screen, the initial location of the ball on the screen might be an I frame. Then, update data and movement vectors could be directly rendered moving the set of pixels representing the ball across screen. One I frame followed by multiple B and P frames rendered directly from the I frame. Another I frame could also be sent at the end to clean up the image. In such a fashion, the present invention eliminates the need to store multiple rendered images, and could potentially improve final picture quality.

In that regard, rendering an I frame requires about the same amount of calculation time as rendering one frame to an NTSC video frame. Rendering the B and P frames (in place of rendering approximately 28 full frames) does not require much calculation, just the movement vectors in the picture being rendered, such as someone's arm moving across a background in the picture. The present invention thereby significantly reduces the amount of calculations associated with rendering according to the prior art.

Another example of rendering to data compressed video is a currently unnamed subband encoding technique for video. This system sends low frequency video information, mid frequency video information and high frequency "detail" video information.

Low frequency picture information is usually generated by large objects and moving objects. Mid frequency picture information contains most of the added elements to make a fuzzy picture. High frequency (detail) picture information is only obtained from static objects in a picture.

These subband examples are not filtered in only one dimension such as the rate of change on one line of video from light to dark. But these subband filters also filter for any given point in the picture versus time (or across a number of video frames). This is usually referred to as "3D" filtering (time, picture position and amplitude), color information can be treated separately and included as a separate parameter and would make the system "4D", etc.

According to the present invention, rendering of pictures can be applied only to the characteristics required by objects changing in the picture art. Rendering directly to this type of subband encoded picture data would also save much of the rendering computations needed to generate animated digital pictures. A further version of 3D subband video encoding transmits mainly the change information between frames. This type of system lends itself well to the direct rendering provided by the present invention.

Referring now to FIG. 1, an exemplary flowchart illustrating the method of the present invention for direct rendering of video images to a compressed video data format is shown. As seen therein, the method comprises generating (10) encoded video data directly from an electronic graphic system, the encoded video data representing a full frame image, and generating (12) update encoded video data directly from the electronic graphic system, the update encoded video data representing changes in the full frame image. The method further comprises generating (14) movement vector encoded video data directly from the electronic graphic system, the movement vector encoded video data representing movement in the full frame image, and decoding (16) the encoded video data, the update encoded video data, and the movement vector encoded video data for playback at a destination.

Figure 2:
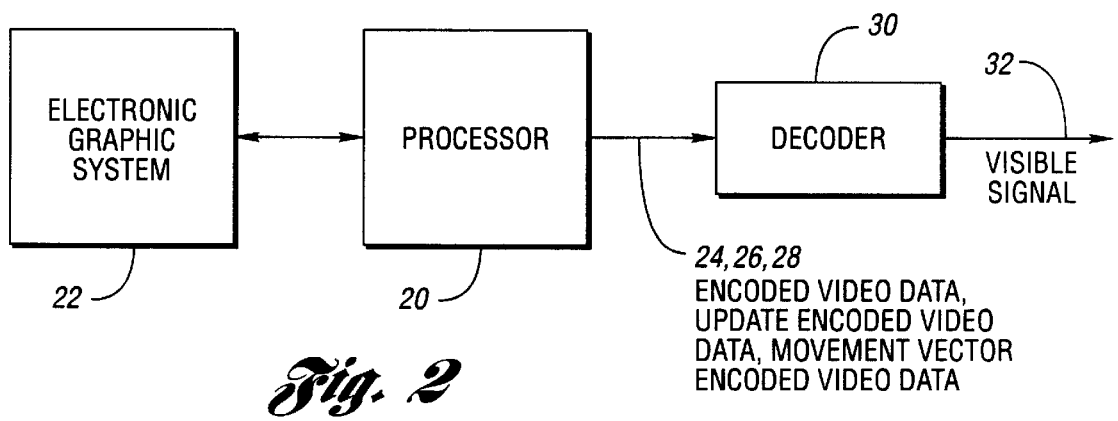
FIG. 2 is an exemplary simplified block diagram of the system of the present invention.

Referring next to FIG. 2, an exemplary simplified block diagram of the system of the present invention for direct rendering of video images to a compressed video data format is shown. As seen therein, the system preferably comprises an appropriately programmed processor (20) for digital signal generation. In that regard, processor (20) is provided in communication with an electronic graphic system (22), computer animation system, or the like, such as a character generator.

Once programmed, processor (20) provides control logic for performing various functions of the present invention. In that regard, the control logic of processor (20) is operative to generate encoded video data (24) directly from electronic graphic system (22), the encoded video data (24) representing a full frame image. The control logic is further operative to generate update encoded video data (26) directly from the electronic graphic system (22), the update encoded video data representing changes in the full frame image. Control logic is further operative to generate movement vector encoded video data (28) directly from the electronic graphic system (22), the movement vector encoded video data representing movement in the full frame image.

The system of the present invention still further comprises a decoder (30) provided in communication with processor (20). Decoder (30) decodes the encoded video data, the update encoded video data, and the movement vector encoded video data for playback as a visible signal (32) at a destination. In that regard, decoder (30) can exist at the destination and may have any type of digital format, either now known (e.g., MPEG layer 2 or 3) or later developed.

Figure 3:
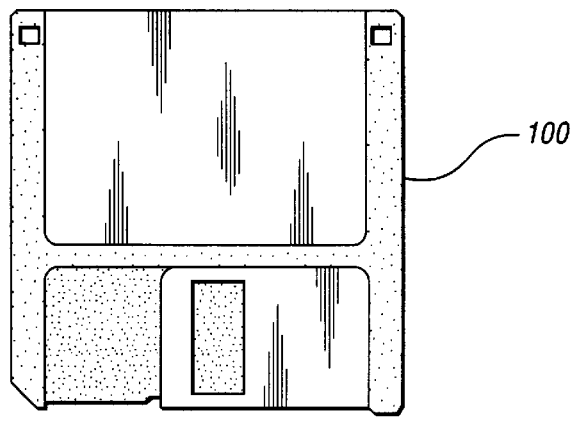
FIG. 3 is an exemplary storage medium for use with the product of the present invention.

Referring finally to FIG. 3, an exemplary storage medium (100) for use with the product of the present invention is shown. In that regard, storage medium (100) is depicted in FIG. 3 as a floppy disk, although any other type of storage medium may also be employed. Storage medium (100) is designed for use with an electronic graphic system or the like, as well as a decoder. In such a fashion, the product of the present invention is capable of direct rendering of video images to a compressed video data stream.

Storage medium (100) has recorded thereon computer readable programmed instructions which are operative to perform various functions of the present invention. More particularly, such instructions are operative to generate encoded video data directly fry the electronic graphic system, the encoded video data representing a full frame image, to generate update encoded video data directly from the electronic graphic system, the update encoded video data representing changes in the full frame image, and to generate movement vector encoded video data directly from the electronic graphic system, the movement vector encoded video data representing movement in the full frame image, wherein the decoder is provided for decoding the encoded video data, the update encoded video data, and the movement vector encoded video data for playback at a destination.

With respect to the present invention, as previously described, the encoded video data preferably comprises an I frame, the update encoded video data a P or B frame, and the movement vector encoded video data a P or B frame. Alternatively, the encoded video data may comprise high frequency information, the update encoded video data mid-frequency information, and the movement vector encoded video data low frequency information.

Still further, the update encoded video data and the movement vector encoded video data are preferably generated directly to the data stream for reconstruction at the destination. Such generation of the update encoded video data and the movement vector encoded video data is also preferably based on a prediction scheme.

Significantly, by bypassing conventional animation methods and rendering directly to MPEG (or other) data compressed video, interactive cable television is available from a rendering server on demand, replacing huge amounts of asset pictures. In such a fashion, the present invention acts as an extension of interactive systems, generating interactive cable TV services at high quality and low cost. Moreover, the present invention makes interactive gaming possible over a cable TV system or a narrow data path. Still further, the present invention does so while reducing the computing power associated with prior art systems and methods by a factor of greater than ten, and is directly compatible with existing and future cable TV and other systems.

As is readily apparent from the foregoing description, then, the present invention provides a method, system and product for direct rendering of visual images to a compressed video data stream. More specifically, the present invention provides for rendering on demand, thereby eliminating the need to store huge amounts of asset pictures.

It is to be understood that the present invention has been described in an illustrative manner, and that the terminology which has been used is intended to be in the nature of words of description rather than of limitation. As previously stated, many modifications and variations of the present invention are possible in light of the above teachings. Therefore, it is also to be understood that, within the scope of the following claims, the invention may be practiced otherwise than as specifically described herein.

What is claimed is:

1. A method for direct rendering of video images to a compressed video data stream, the method comprising:

generating encoded video data directly from an electronic graphic system, the encoded video data comprising high frequency information representing a full frame image;

generating update encoded video data directly from the electronic graphic system, the update encoded video data comprising mid-frequency information representing changes in the full frame image;

generating movement vector encoded video data directly from the electronic graphic system, the movement vector encoded video data comprising low frequency information representing movement in the full frame image; and decoding the encoded video data, the update encoded video data and the movement vector encoded video data for playback at a destination.

2. The method of claim 1 wherein the encoded video data, the update encoded video data and the movement vector encoded video data are generated at the destination.

3. The method of claim 1 wherein the update encoded video data and the movement vector encoded video data are generated based on a prediction scheme.

4. A system for direct rendering of video images to a compressed video data stream, the system comprising:

an electronic graphic system;

control logic operative to generate encoded video data directly from an electronic graphic system, the encoded video data comprising high frequency information representing a full frame image, generate update encoded video data directly from the electronic graphic system, the update encoded video data comprising mid-frequency information representing changes in the full frame image, and generate movement vector encoded video data directly from the electronic graphic system, the movement vector encoded video data comprising low frequency information representing movement in the full frame image; and decoder for decoding the encoded video data, the update encoded video data and the movement vector encoded video data for playback at a destination.

5. The system of claim 4 wherein the encoded video data, the update encoded video data and the movement vector encoded video data are generated at the destination.

6. The system of claim 4 wherein the update encoded video data and the movement vector encoded video data are generated based on a prediction scheme.

7. A product for direct rendering of video images to a compressed video data stream, the product for use with an electronic graphic system and a decoder, the product comprising:

a storage medium; and computer readable instructions recorded on the storage medium, the instructions operative to generate encoded video data directly from the electronic graphic system, the encoded video data comprising high frequency information representing a full frame image, generate update encoded video data directly from the electronic graphic system, the update encoded video data comprising mid-frequency information representing changes in the full frame image, and generate movement vector encoded video data directly from the electronic graphic system, the movement vector encoded video data comprising low frequency information representing movement in the full frame image, wherein the decoder is provided for decoding the encoded video data, the update encoded video data and the movement vector encoded video data for playback at a destination.

8. The product of claim 7 wherein the encoded video data, the update encoded video data and the movement vector encoded video data are generated at the destination.

9. The product of claim 7 wherein the update encoded video data and the movement vector encoded video data are generated based on a prediction scheme.

* * * * *